Patented Feb. 28, 1933

1,899,616

UNITED STATES PATENT OFFICE

GEORGE W. HEISE, OF LAKEWOOD, OHIO, ASSIGNOR TO NATIONAL CARBON COMPANY, INC., A CORPORATION OF NEW YORK

GALVANIC CELL

No Drawing.    Application filed October 28, 1929. Serial No. 403,131.

The invention relates to galvanic battery cells of the kind comprising a metal anode, a cathode containing conductive carbonaceous material, and electrolyte containing an ammonium halide, such as the chloride, at least a part of the electrolyte being gelatinized with paste-forming substances, such as flour, corn-meal, or starch. The invention may be applied to cells of this kind in which air, chlorine or other oxidizing gas serves to depolarize the cathode, but it may also be embodied in sealed cells wherein manganese dioxide or its equivalent is used as a depolarizer, and since this latter variety of cells, as exemplified by the ordinary dry cell, is of great commercial importance, the invention will be described in connection therewith.

The object of the invention is to improve cells of the kinds referred to, and to increase the electrical output therefrom.

In a common type of dry cell, widely used in portable electric lamps, the anode consists of a cylindrical zinc cup. The cathode comprises a carbon rod, about the lower portion of which is molded a cylinder of mix containing powdered carbonaceous material and manganese dioxide. The carbon rod and its enveloping mix form a unit usually called a bobbin, which is supported in the zinc cup by suitable means, the diameter of the bobbin being considerably less than that of the anode cup.

The electrolyte is essentially an aqueous solution of ammonium chloride, but zinc chloride is a usual additional component. In preparing the bobbin, the mix is made wet with electrolyte and molded about the carbon, and the cell is completed without removing from the bobbin the liquid thus incorporated. The space between the electrodes is filled, in one way or another, with an additional portion of electrolyte gelatinized with flour and starch to form a thick paste. The cell is sealed almost hermetically by wax or other sealing means.

Since the ammonium chloride of a dry cell is consumed in the operation of the cell, it will be evident that the quantity put into the cell should be regulated so as to bear a proper relation to the quantities of anode metal and depolarizer. Moreover, the optimum quantity of ammonium chloride depends on the class of service for which the cell is intended, and the quantity which gives maximum output in light service may not be the most favorable in heavy service. In general the optimum quantity is greater than can be dissolved in the liquid present in the cell, and it is common practice to incorporate an additional quantity of the salt in solid form by mixing it with the carbon and manganese dioxide used in making the bobbin.

Such addition of solid ammonium chloride to the mix permits the introduction of more of the salt into the cell without requiring any important modification of the method of handling the cell components because the mix in any event contains a high proportion of solids. The paste, on the other hand, is introduced into the cell as a liquid, and in handling the paste by the methods now used in battery manufacture, a solid constituent would tend to settle out and would be objectionable for that reason. Furthermore, battery pastes in general tend to increase their viscosity between preparation and use, and this action is accelerated by increasing the concentration of ammonium chloride in the paste. The rate of thickening may be so increased that problems are introduced in the handling of the paste. It has apparently not been suspected heretofore that the addition of solid ammonium chloride to the paste would be any improvement over adding it to the mix, and the use of pastes unsaturated with respect to ammonium chloride is now universal. For example, a typical dry-cell paste contains, by weight, one part of colloidal gelatinizing agent and three parts of electrolyte, the former being two-thirds commercial starch and one-third wheat flour, and the electrolyte containing, by weight 10 to 15 parts of zinc chloride, about 40 parts of ammonium chloride, and 100 parts of water. This electrolyte, at 30° C., is a little less than nine-tenths saturated with ammonium chloride.

In accordance with my invention, a paste is used which, as introduced into the cell, contains solid ammonium chloride.

The use of "salted" paste, that is, paste in which solid ammonium chloride is present in sufficient proportions, results in a remarkable improvement. With mix containing a usual proportion of solid ammonium chloride, and paste differing from the usual variety only in having its electrolyte saturated with ammonium chloride, and containing an additional quantity of solid salt equal to about one-fourth that in solution in the paste, the output in both light and heavy service is increased by some 15%. The carbonaceous constituent of the cells just referred to is principally graphite, while the depolarizer is natural manganese dioxide, mineralogically known as pyrolusite. When the mix is modified with respect to the fineness of the carbonaceous constituent, or with respect to the proportions of carbon and depolarizer, the effect of salting the paste varies somewhat; but in general the result is to give a significant increase in heavy service, usually accompanied by an increase in light service.

At this point it may be explained that the statements herein with respect to continuous service refer to tests in which a cell having an anode 1¼ in. in diameter and 2¼ in. high is discharged continuously through a resistance of 4 ohms until its closed circuit voltage falls to the arbitrary value of 0.75 volt; while intermittent service is measured by discharging the cell through a 4 ohm resistance for 5 minutes each day until the closed circuit voltage at the end of a discharge period falls to 0.75 volt.

With mixes of other types, containing other varieties of carbon, or artificial manganese dioxide, the advantage gained by salting the paste may be quite different in magnitude, and with certain of these mixes, it is much greater. Thus, in a mix containing pyrolusite, with acetylene black as the carbonaceous constituent, an improvement of some 40% was observed in continuous service, while in a mix containing acetylene black and a form of artificial manganese dioxide constituting a more active depolarizer than pyrolusite, preliminary tests promise a degree of improvement still much larger. Moreover, it is indicated that when salted paste is used, the solid ammonium chloride in the bobbin may be increased beyond the proportion which is optimum for cells using unsalted paste, whereby there is obtained one increment in service directly due to the salting of the paste, and a second increment due to the additional solid ammonium chloride in the bobbin.

The salted paste required by my invention may be prepared in various ways, the following being an example: Into 6 weights of paste of the composition recited above there is stirred one weight of solid ammonium chloride ground to pass a 40 mesh screen. At 30° C. more than one-third of all the ammonium chloride in the paste so formed is in the solid state.

It will be apparent that when dry cells are made in the usual way, with solid ammonium chloride in the bobbin, and paste the liquid phase of which is unsaturated with ammonium chloride, and the cells are placed in storage, diffusion will tend to saturate the paste with the ammonium salt. The total concentration of ammonium chloride attained in the paste will depend on the maximum temperature reached by the cell and the duration of such temperature, the solubility of the salt in the electrolyte increasing as the temperature rises. Abnormal storage temperatures will result in abnormal concentrations of ammonium chloride in the paste. Moreover, the content of ammonia in the paste of an unused cell may rise well above that which corresponds to the content of ammonium chloride, due to action of the electrolyte on the anode to form insoluble basic salts of which the most important is believed to have the formula $Zn(NH_3)_2Cl_2$. Cells in which the ammonia content of the paste has been increased by the presence of ammoniated salts of this nature are not to be confused with the cells of my invention, a distinguishing feature of the latter being that in the freshly-made condition, they contain solid ammonium chloride in the paste. Cells are not improved by increasing the concentration of ammoniated compounds in the paste through storage for prolonged times or at high temperatures. The higher the storage temperature, the stronger is the tendency to transfer ammonium chloride to the paste, but it is known that high storage temperatures are detrimental to dry cells, as are prolonged storage periods. The formation of basic zinc salts at the expense of the electrolyte and the anode is obviously an undesirable effect.

Even small proportions of solid ammonium chloride in the paste of a freshly-made cell, for example a quantity equal to 5% of the quantity in solution, usually bring about a distinct increase in the output of the cell. No figure can be given for the optimum degree of salting in all classes of cells, but a quantity of solid ammonium chloride equal to about 25% of that dissolved in the paste may be cited as a proportion which is satisfactory in many cases. It is also impossible to indicate the maximum degree of salting which may be useful.

The use of salted paste in battery cells is disclosed in my pending application, Serial No. 49,404, filed August 10, 1925.

I claim:—

1. In a freshly made galvanic cell having an anode, and a cathode containing a depolarizer and solid ammonium halide, an immobilized electrolyte in the space between the anode and the cathode containing a substantial quantity of an ammonium halide in solid form and an aqueous solution saturated with respect to said halide.

2. In a freshly made galvanic cell having an anode of a metal which is electro-negative to carbon and a cathode containing conductive carbonaceous material, manganese dioxide and a solid ammonium halide, an immobilized electrolyte containing solid ammonium halide in the space between the anode and the cathode, and an aqueous solution saturated with respect to said halide.

3. In a freshly made galvanic cell having a zinc anode and a cathode containing conductive carbonaceous material, a form of manganese dioxide having a more active depolarizing action than pyrolusite and solid ammonium chloride, an electrolyte in the space between the anode and the cathode containing solid ammonium chloride and an aqueous solution saturated with respect to ammonium chloride and gelatinized with a colloidal substance.

4. In a freshly made galvanic cell sealed from the atmosphere and having a zinc anode and a cathode containing gas black, solid ammonium chloride and a form of manganese dioxide more active than pyrolusite as a depolarizer, an electrolyte in the space between the anode and the cathode containing solid ammonium chloride and an equeous solution saturated with respect to ammonium chloride and gelatinized with a colloidal substance.

In testimony whereof, I affix my signature.

GEORGE W. HEISE.